Figure 1:
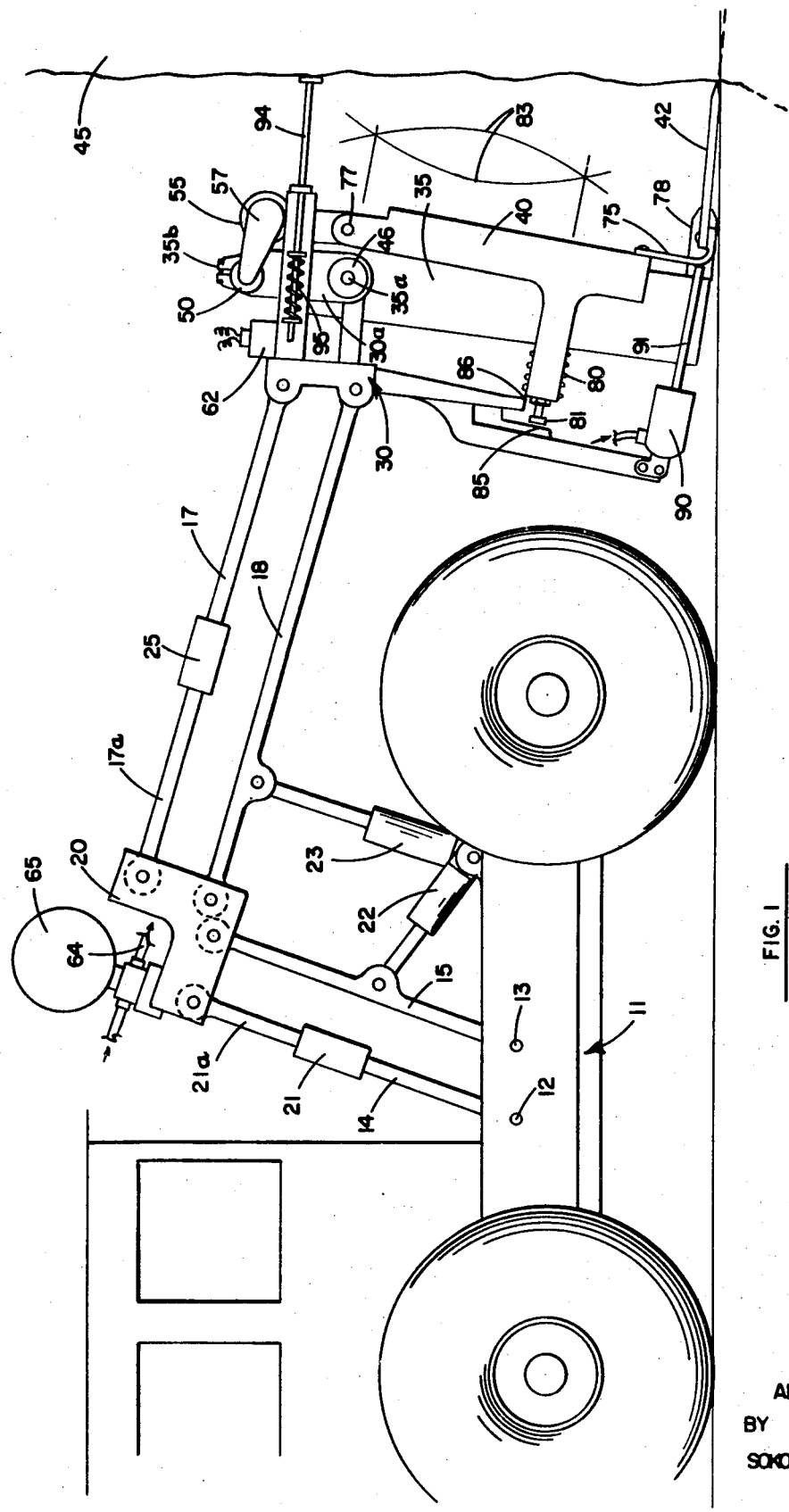

United States Patent

Bodine

[15] 3,688,824
[45] Sept. 5, 1972

[54] SONIC TIMER BUTTING METHOD AND APPARATUS

[72] Inventor: Albert G. Bodine, 7877 Woodley Ave., Van Nuys, Calif. 91406

[22] Filed: March 15, 1971

[21] Appl. No.: 124,349

[52] U.S. Cl. ........................... 144/309 AC, 144/34 A
[51] Int. Cl. .............................................. A01g 23/02
[58] Field of Search ......... 144/3 D, 34 R, 34 A, 34 F, 144/309 AC

[56] References Cited

UNITED STATES PATENTS 2,474,037  6/1949  Cuthrell ................... 144/34 A

Primary Examiner—Gerald A. Dost
Attorney—Sokolski & Wohlgemuth

[57] ABSTRACT

Sonic energy is coupled from an orbiting mass oscillator to a resonator member, the frequency of oscillation of the energy being such as to set up resonant vibration of the resonator member. Unidirectional pulses of vibrational energy are coupled from the resonator through an acoustical rectifier to a cutter blade, the blade being biased against timber to be cut. The vibrational energy imparted to the cutter blade thus efficiently implements the cutting action.

21 Claims, 9 Drawing Figures

INVENTOR
ALBERT G. BODINE
BY
SOKOLSKI & WOHLGEMUTH
ATTORNEYS

INVENTOR
ALBERT G. BODINE
BY
SOKOLSKI & WOHLGEMUTH
ATTORNEYS

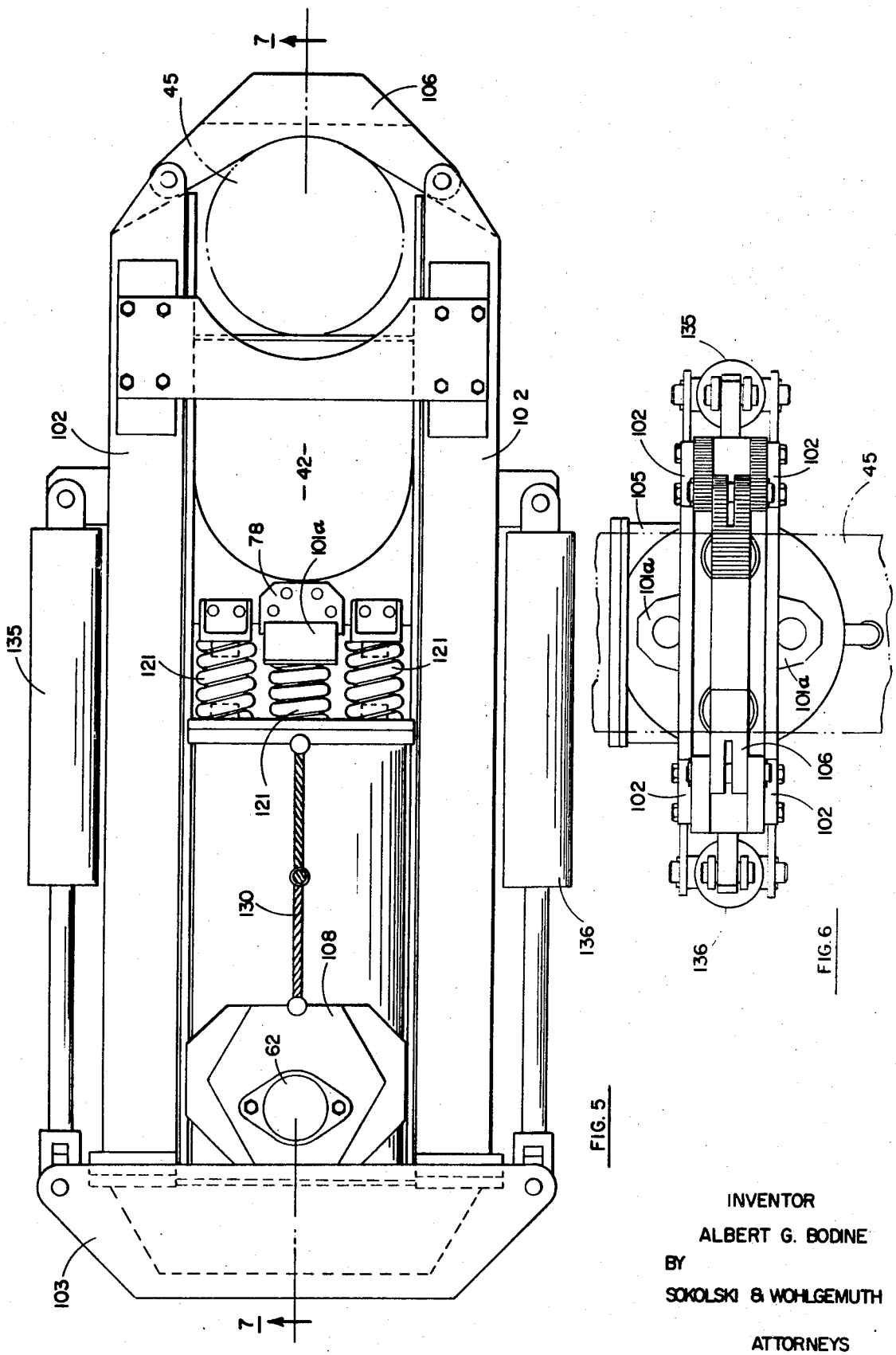

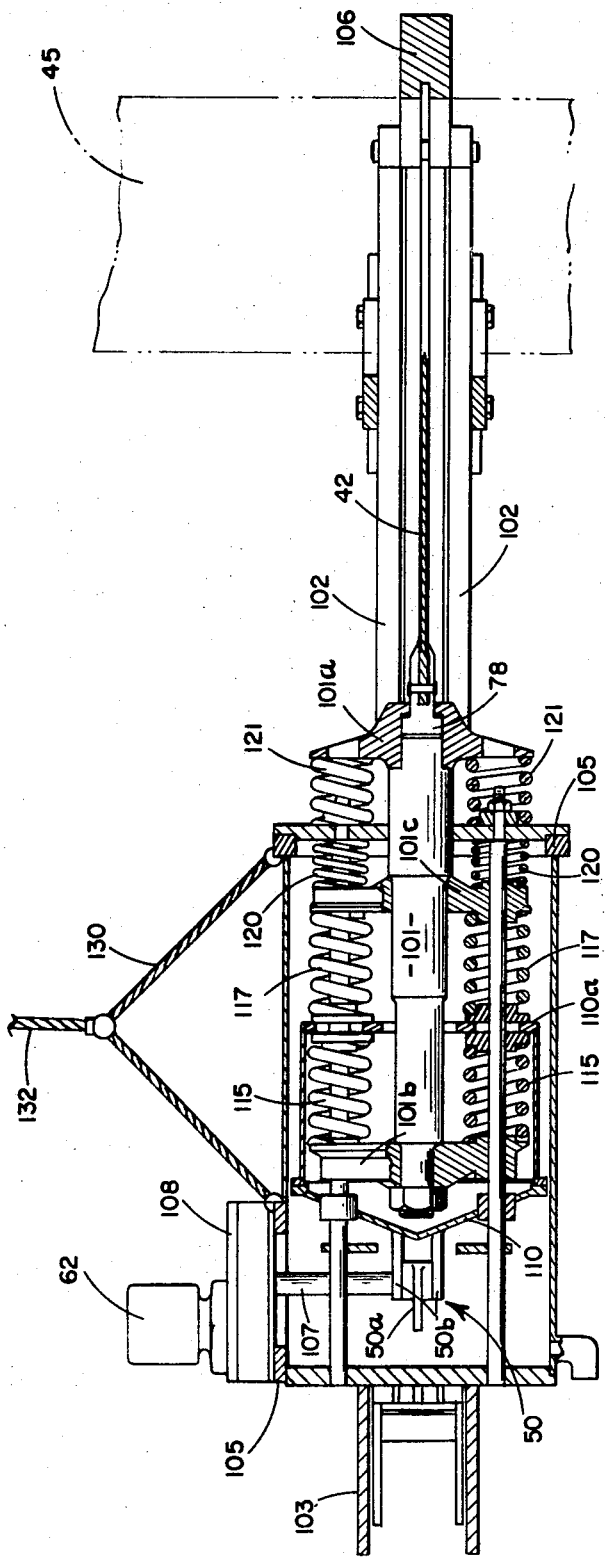

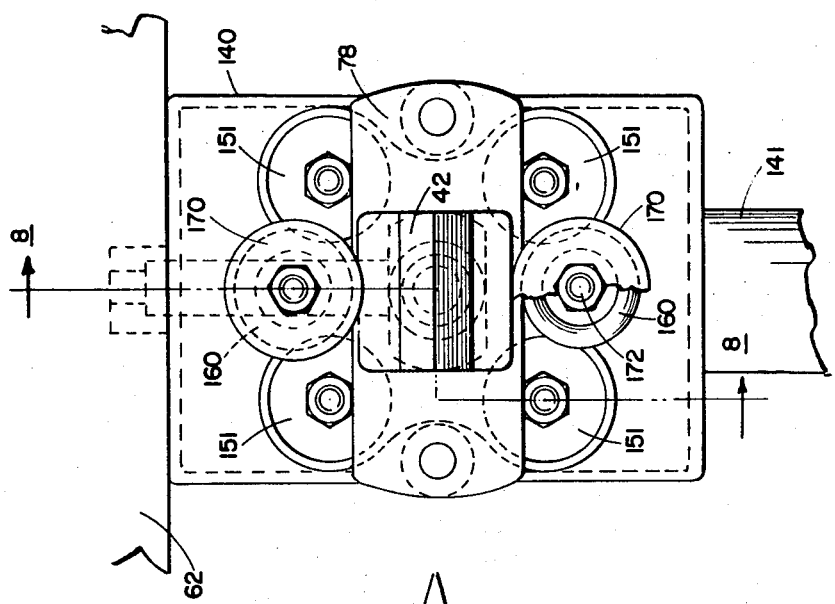
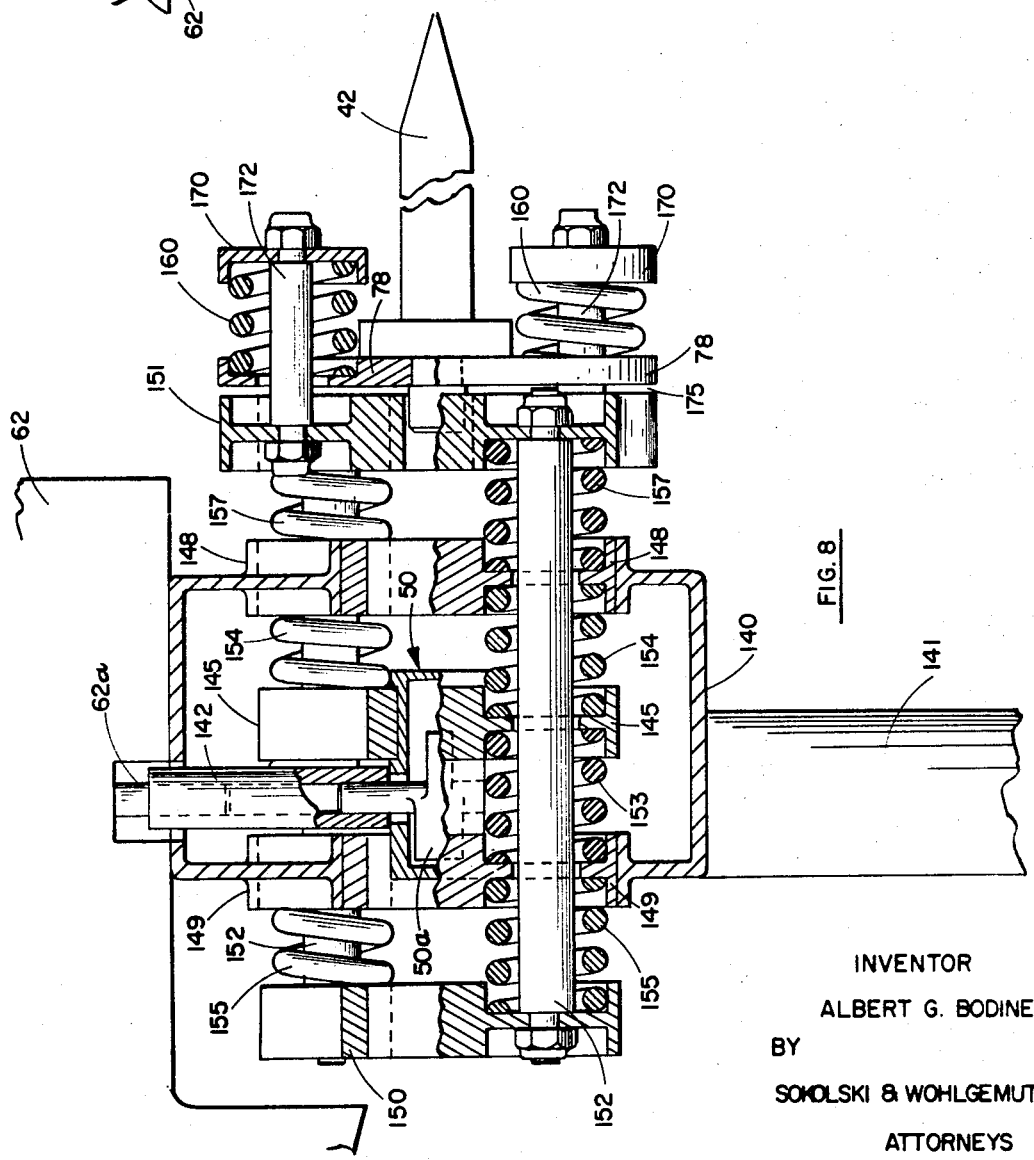

SONIC TIMER BUTTING METHOD AND APPARATUS

This invention relates to a method and apparatus for cutting standing timber and more particularly to such a method and apparatus in which sonic energy is utilized to implement the cutting action.

A commonly used technique for cutting standing timber involves the use of a motor driven chain saw which is mechanically driven in linear sliding fashion to provide the cutting action. While certain chain saws are relatively efficient in their operation, they have a shortcoming in that it is impossible to cut the trees very close to the ground. This is in view of the fact that due to the drive mechanism structure, it is difficult to position the cutting blade very close to the ground surface; further it is undesirable to get the blade too close to the ground where it might drag along the ground surface such as to damage the blade teeth and the chain. Thus, in using a chain saw, tree stumps which rise a significant distance above the ground surface are left remaining. This not only is a waste of timber but also makes for an unsightly and bothersome stumped area which is an obstacle course to vehicles that may be used in the lumbering operation. Later, when the land is to be used for other purposes, such as farming or as a construction site, the stumps must be uprooted or burned out. Further, with cutting such as implemented with a hydraulically forced shear blade, the wood fibers often tend to compress together offering considerable resistance to the cutting operation. This could be alleviated if means were available to separate the fibers from each other so that they would present less resistance to the cutting edge.

Hydraulically driven paired shearing blades are also utilized in cutting timber. As for the chain saw, with this type of device it is difficult or impossible to cut a tree close to the ground level. Further, with this type of hydraulically driven blade, it is difficult or impossible to cut hard or frozen wood. Also, with this type of paired blade operation, the opposing blades finish their cutting in the center of the tree, with the tree falling over in such a manner that it often rips the last bit of wood apart, resulting in center damage to the end of the log.

The technique and apparatus of this invention overcomes the aforementioned shortcomings of the prior art by utilizing sonic energy for implementing the cutting action. In view of the fact that the sonic energy is operated in conjunction with a resonant vibration system, high vibrational accelerations are obtained at the sonic frequencies utilized, which operates efficiently against the large mass provided by the standing timber, high acceleration relative motion being developed therebetween. In view of the fact that conventional cutting blade and drive equipment is not needed, it is feasible to bring the cutting blade right to the ground level of the tree trunk so that a cut can be made flush with the ground surface so that stumps are not left standing. Further, the vibratory sonic energy tends to separate the fibers of the wood from each other, which greatly facilitates the cutting action. Still further, it is possible to efficiently cut the timber with a single cutting blade which enters the trunk from only a single side thereof, this in view of the high relative acceleration attained between the vibratory blade and the high mass effect provided by the tree trunk, at sonic frequency, such interaction being possible without the need for applying any significant amount of backup force against the tree and blade. There also is typically no need for a high mass support and drive member for the blade in view of the fact that the drive force is developed by the vibratory energy and need not depend on the conventional type of mechanical driving force.

The vibratory drive of this invention is very effective in cutting hard or frozen wood, the cells of which are frangible to vibratory energy and to which the vibratory drive source can be efficiently impedance matched. It is further to be noted that the sonic drive system of this invention is preferably utilized in such a manner that the force for the cutting action is provided in vibratory pulses such that the blade is effectively disengaged on each vibration cycle, releasing the fibers momentarily, thus preventing them from bunching up, and rather engendering their separation. The cutting action thus tends to act on the individual fibers of the wood, making for efficient and clean cutting action right on to the very finish of the cut. This not only greatly facilitates the cutting operation but also minimizes damage to the timber.

It is therefore an object of this invention to facilitate the harvesting of timber.

It is a further object of this invention to enable the cutting of timber right at the ground level so as to avoid leaving stumps.

It is still another object of this invention to provide a more efficient technique for cutting timber by utilizing sonic energy for implementing the cutting action.

It is still a further object of this invention to provide a more efficient technique and apparatus for cutting hard or frozen timber.

Figure 2:
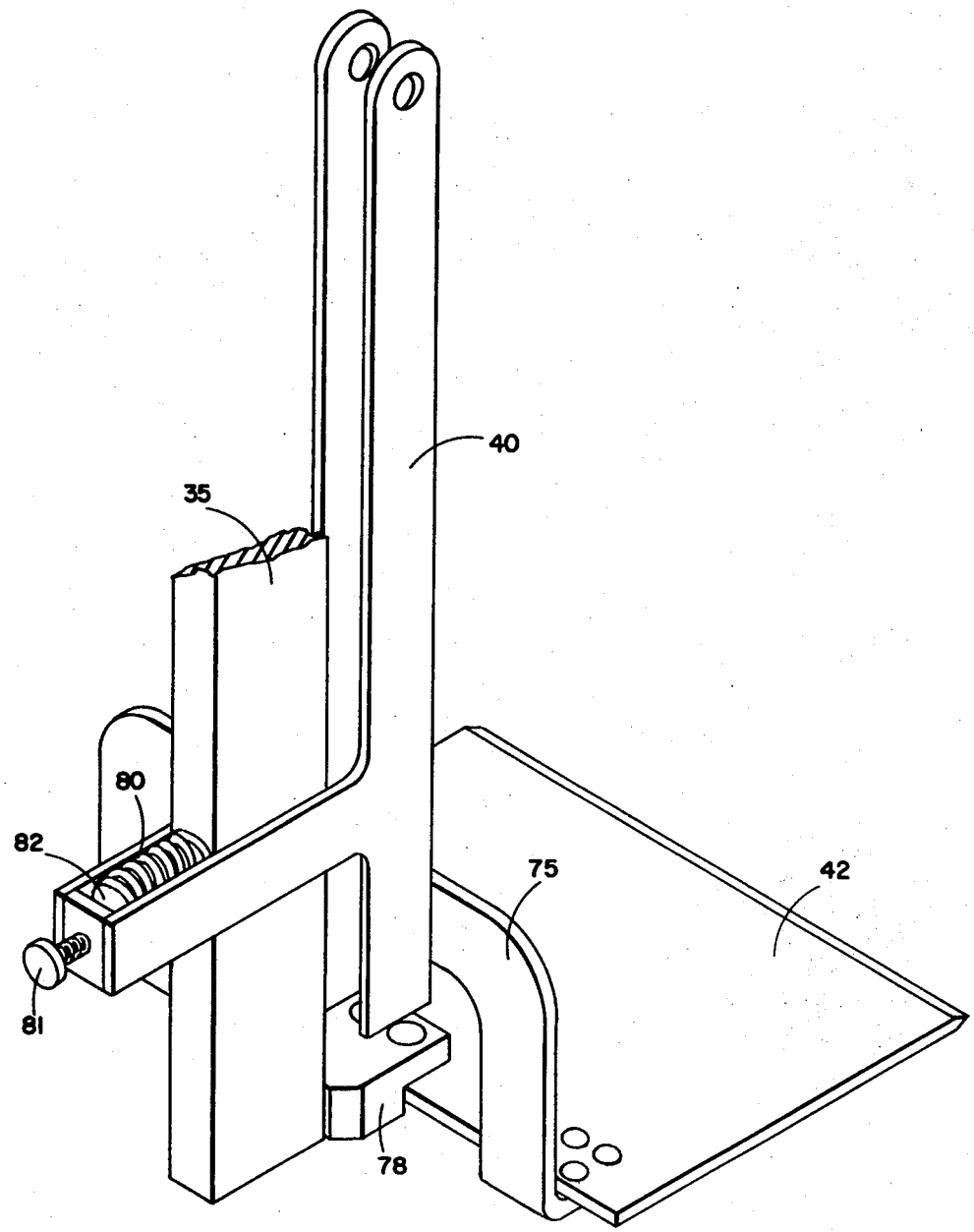
Figure 3:
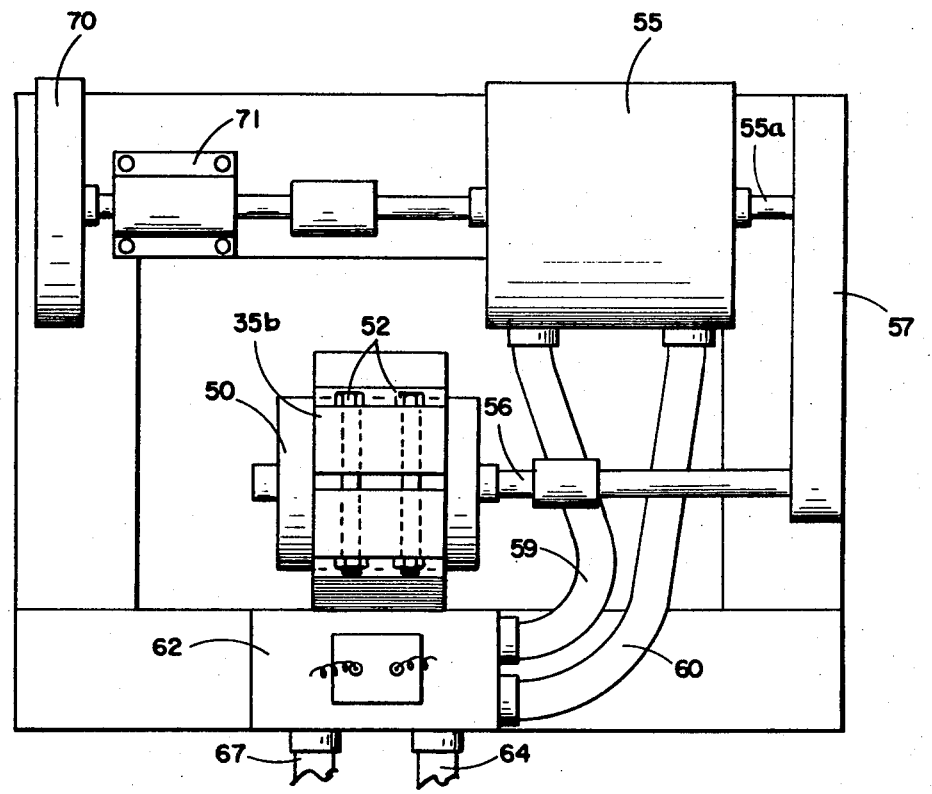
Figure 4:
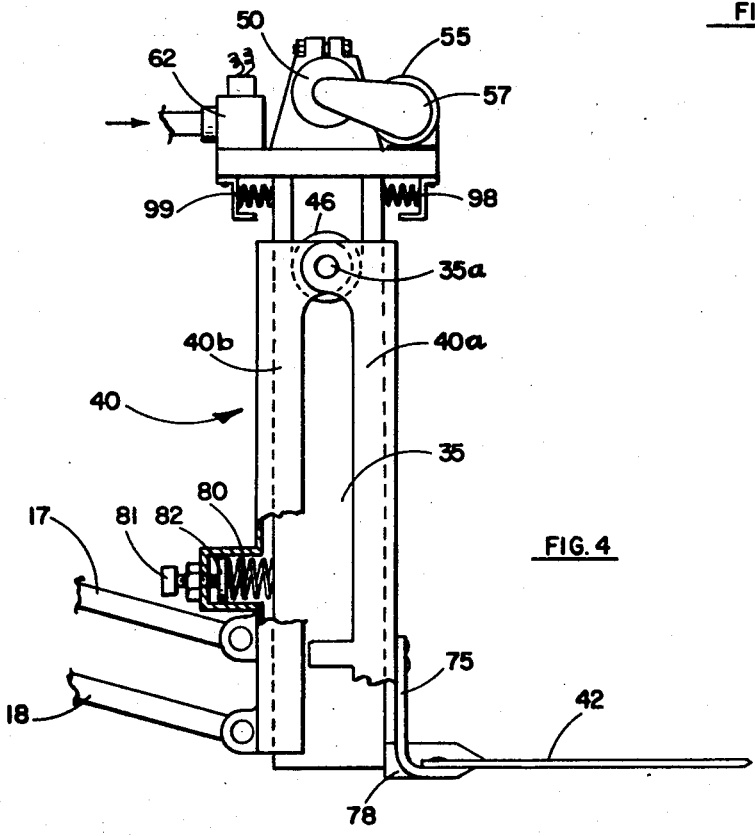

Other objects of this invention will become apparent as the description proceeds in connection with the accompanying drawings, of which:

FIG. 1 is a side elevational view of a first embodiment of the invention,

FIG. 2 is a perspective view illustrating the cutting blade and the drive therefor of the embodiment of FIG. 1, FIG. 3 is a top plan view of the embodiment of FIG. 1, FIG. 4 is a side elevational view of an alternative drive structure which may be utilized in the embodiment of FIG. 1, FIG. 5 is a top plan view of a second embodiment of the device of the invention, FIG. 6 is an end elevational view of the embodiment of FIG. 5, FIG. 7 is a cross-sectional view taken along the plane indicated by 7—7 in FIG. 5, FIG. 8 is a cross-sectional view of a third embodiment of the device of the invention taken along the plane indicated by 8—8 in FIG. 9, and FIG. 9 is an end elevational view of the embodiment of FIG. 8.

Briefly described, the technique and apparatus of the invention are as follows:

Vibratory energy at a sonic frequency is generated typically by means of an orbiting mass oscillator, the output of which is coupled to a resonator member which may comprise an elastic bar or the like. The oscillator is driven at a frequency such as to cause resonant elastic vibration of the resonator member. Vibratory energy is coupled from the resonator member to a cutter blade which engages the timber to be cut. A mechanical rectifier is interposed between the blade and the timber so as to convert the energy into unidirectional vibrational pulses. The rectifier action is implemented by means of resilient bias means which may be in the form of a bias spring which resiliently urges the assembly against the timber, or alternatively which may only bias the rectifier gap itself. The bias spring may be adjusted so that on the vibratory excursions away from the tree trunk, the blade will disengage its force from the timber but will be driven sharply against the timber in a pulsating manner during the vibratory excursions towards the tree trunk. The cutting blade thus will be driven in a vibratory pulsating manner against the tree trunk with a high force by virtue of the acceleration derived from the resonant vibration system and the high effective mass provided by the standing tree trunk. In facilitating the alignment of the cutter blade with the tree, an alignment frame may be utilized so that the trunk can be cut right flush with the surface of the ground to avoid any standing stumps whatsoever.

It has been found most helpful in analyzing the method and device of this invention to analogize the acoustically vibrating circuit utilized to an equivalent electrical circuit. This sort of approach to analysis is well known to those skilled in the art and is described, for example, in Chapter 2 of "Sonics" by Hueter and Bolt, published in 1955 by John Wiley and Sons. In making such an analogy, force F is equated with electrical voltage E, velocity of vibration $u$ is equated with electrical current $i$, mechanical compliance $C_m$ is equated with electrical capacitance $C_e$, mass M is equated with electrical inductance L, mechanical resistance (friction) $R_m$ is equated with electrical resistance R and mechanical impedance $Z_m$ is equated with electrical impedance $Z_e$.

Thus, it can be shown that if a member is elastically vibrated by means of an acoustical sinusoidal force $F_o$ sin$\omega t$ ($\omega$ being equal to $2\pi$ times the frequency of vibration), that $$Z_m = R_m + j\left(\omega M - \frac{1}{\omega C_m}\right) = \frac{F_0 \sin \omega t}{u} \quad (1)$$

Where $\omega M$ is equal to $1/\omega C_m$, a resonant condition exists, and the effective mechanical impedance $Z_m$ is equal to the mechanical resistance $R_m$, the reactive impedance components 107M and $1/\omega C_m$ cancelling each other out. Under such a resonant condition, velocity of vibration $u$ is at a maximum, power factor is unity, and energy is more efficiently delivered to a load which the resonant system may be coupled.

It is important to note the significance of the attainment of high acoustical "Q" in the resonant system being driven, to increase the efficiency of the vibration thereof and to provide a maximum amount of power. As for an equivalent electrical circuit, the "Q" of an acoustically vibrating system is defined as the sharpness of resonance thereof and is indicative of the ratio of the energy stored in each vibration cycle to the energy used in each such cycle. "Q" is mathematically equated to the ratio between $\omega M$ and $R_m$. Thus, the effective "Q" of the vibrating system can be maximized to make for highly efficient, high-amplitude vibration by minimizing the effect of friction in the system and/or maximizing the effect of mass in such system. In this instance the "Q" can be made large by having a large resonator system in back of the rectifier.

The instantaneous displacement, "y," of a sinusoidally vibrating mass can represented by the following equations:
$$y = Y \cos \omega t \quad (2)$$
where Y is the maximum displacement in the vibration cycle and $\omega$ is the angular velocity of such displacement.

The acceleration, "a," of the mass can be obtained by differentiating Equation 6 twice, as follows:
$$a = d^2 y/dt^2 = -Y\omega^2 \cos(\omega t) \quad (3)$$

The acceleration thus is a function of $\omega^2$ which is equal to $(2\pi f)^2$. It thus should be apparent that very high G acceleration can be obtained in a vibratory system at even moderate vibration frequencies. This is especially effective in giving a large inertia to the tree trunk, so as to aid the cutting action without needing a large backup element.

In considering the significance of the parameters described in connection with Equation (1), it should be kept in mind that the total effective resistance, mass, and compliance in the acoustically vibrating system are represented in the equation and that these parameters may be distributed throughout the system rather than being lumped in any one component or portion thereof.

It is also to be noted that orbiting-mass oscillators are preferably utilized in the implementation of the invention that automatically adjust their output frequency and phase to maintain resonance with changes in the characteristics of the load. Thus, in the face of changes in the effective mass and compliance presented by the load with changes in the conditions of the work material as it is sonically excited, such as the changes in trunk stiffness as the cut is progressed, the system automatically is maintained in optimum resonant operation by virtue of the "lock-in" characteristic of applicant's unique orbiting-mass oscillator used here. Furthermore, in this connection the orbiting-mass oscillator automatically changes not only its frequency but its phase angle and therefore its power factor with changes in the resistive impedance load, such as changes in frictional grip on the blade, to assure optimum efficiency of operation at all times. The vibrational output from such orbiting-mass oscillators also tends to be constrained by the resonator to be generated along a controlled predetermined coherent path to provide maximum output along a desired axis.

Referring now to FIGS. 1-3, a first embodiment of the device of the invention is illustrated. Mounted on vehicle 11 for rotatable motion about pivot points 12 and 13 are support bars 14 and 15. A pair of articulated boom members 17 and 18 are pivotally supported on frame member 20, this frame member being pivotally supported on bar 15 and the shaft 21a of hydraulic cylinder 21. Hydraulic cylinders 22 and 23 are pivotally supported on vehicle 11 and their drive stems pivotally attached to bar 15 and boom 18 respectively. Boom 17 has a hydraulic cylinder 25 incorporated therein, the drive stem of cylinder 25 being attached to or integrally formed with arm portion 17a of the boom. Booms 17 and 18 are pivotally connected to frame 30 from which the resonant bar 35 and the support structure 40 for cutting blade 42 is suspended. It thus can be seen by adjusting the various hydraulic cylinders that the blade 42 can be placed in the desired cutting position and attitude against the trunk of a tree 45 to be cut. As indicated in FIG. 1, this cutting position is flush with the surface of the ground with the blade being slightly downwardly angulated so as to cut through the trunk at a downward angle running slightly below the ground surface.

Bar member 35 is supported on support structure 30 on a pair of nodal pins 35a which extend outwardly therefrom and are seated in rubber bushings 46, these rubber bushings being fitted into apertures formed in arm portions 30a which extend from the support structure 30. Bar member 35 has a bifurcated top end portion 35b which has an aperture therein in which orbiting mass oscillator 50 is fitted. The oscillator casing is held in tight engagement with bar member 35 by means of bolts 52 which fit through the forked end portion 35b of the bar and are tightened to provide the desired clamping action.

Oscillator 50 may be an orbiting mass oscillator of the type described in my U.S. Pat. No. 3,402,612, having a cylindrical rotor which rolls around a raceway formed in the oscillator housing. When the rotor is rotatably driven at a sonic frequency, vibratory energy at the frequency of rotation is developed in the casing thereof, this energy being transferred to resonant bar 35. Referring particularly to FIG 3, the rotor of oscillator 50 is rotatably driven by means of hydraulic motor 55, the output shaft 55a of which is coupled to the rotor drive shaft 56 by means of drive case 57 which may include a gear train or a drive belt. Motor 55 is rotatably driven by means of hydraulic power supplied through lines 59 and 60, the power in these lines being controlled by means of hydraulic valve 62. Valve 62 may be electrically controlled and receives input drive on line 64 from an appropriate hydraulic source (not shown). Return flow for the hydraulic drive is handled by line 67. An accumulator 65 is provided for the hydraulic system. Hydraulic motor 55 has a flywheel 70 attached to its drive shaft, rotatable support for the flywheel shaft being provided by means of bearing member 71.

As can best be seen in FIGS. 1 and 2, cutter blade 42 has a resilient bracket member 75 fixedly attached thereto, bracket member 75 in turn being fixedly attached to support member 40. Support member 40 is pivotally supported on support frame 30 by means of pivot pin 77. An "anvil" member 78 is fixedly attached to blade 42 along the rear edge thereof.

Bar member 35 which is of a resilient material such as steel, and, as already noted, is pivotally supported on support structure 30 in bushings 46 by means of pin 35a, is resiliently urged against anvil member 78 by means of spring 80. The urging action of direct bias spring 80 against bar member 35 is adjusted by means of set screw 81, which has a plate member 82 attached thereto which controls the compression of the spring.

Oscillator 50 is driven by motor 55 at a speed such as to set up resonant elastic vibration of bar member 35 in a lateral vibration mode, i.e., transverse to the longitudinal axis of the bar member so as to set up standing wave vibration of the bar member towards and away from anvil member 78 as indicated by graph lines 83. As indicated in these graph lines, the nodes of the standing wave pattern are located approximately at the coupling points between the bar and spring 80 and support structure 30a. Set screw 81 should be adjusted to provide optimum rectifier action at the interface between bar member 35 and anvil 78. That is to say, vibrational energy should be transmitted to anvil 78 in a series of unidirectional pulses during the vibrational excursions of the bar towards the anvil. On the vibrational excursions away from the anvil, bar member 35 should separate slightly therefrom, acting during this excursion against the resilient action of spring 80. Thus, high level resonant rectified energy is transmitted from bar member 35 to cutter blade 42 to implement the cutting action.

To get the blade 42 started into the tree, forcing action may be provided by means of hydraulic cylinder 90, the drive stem 91 of which is positioned to be driven against the rear of bracket 75. Further action in implementing the starting of the cutting operation can be provided by suitably actuating booms 17 and 18 to cause surfaces 85 and 86 to abut against the head of screw 81 and the back edge of support member 40 respectively. Alignment rod 94 which is resiliently urged forward by means of spring 95 may be used to facilitate the alignment of the device with the tree, and also to tip the tree during cutting.

Referring now to FIG. 4, a variation of the resonant bar and associated drive assembly for the cutter blade is illustrated. As can be seen in this variation, the articulated booms 17 and 18 are attached to the bottom portion of bracket assembly 40. Bracket 40 has two arm portions 40a and 40b which are pivotally joined together on resilient bushings 46, which may be of rubber. As for the first embodiment, bar member 35 has a pair of pins 35a which extend therefrom which are seated in bushings 46. Bar member 35 is resiliently centered by means of centering springs 98 and 99. Bar member 35 is resiliently urged against the anvil 78 of the cutter blade 42 by means of bias spring 80 which is adjusted with set screw 81. However, here the bias varies with the forcing of the assembly against the tree by booms 17 and 18.

Referring now to FIGS 5–7, another embodiment of the device of the invention is illustrated. Cutter blade 42 has an anvil 78 fixedly attached to the rear edge thereof, this anvil being slidably retained in head portion 101a of drive rod 101. Two pairs of bars 102 extend from bracket 103 to provide guidance for blade 42 and supports for detachable holder member 106 which extends across the tree trunk opposite the blade and which may be used for placing and holding the blade in position against the tree trunk 45 to be cut.

Orbiting mass oscillator 50 has an eccentric rotor member 50a which is mounted for rotation on bearings formed in brackets 50b. Rotor 50a is rotatably driven by means of motor 62 which is supported on casing 105 and is connected to flexible drive shaft 107 through gear train 108. Drive shaft 107 is coupled to rotor 50a by means of a rubber hose. The bearing brackets 50b of oscillator 50 are connected to a resonator housing 110. Drive member 101 has a pair of oppositely positioned flanges 101b and 101c fixedly attached thereto. A first set of springs 115 are retained between flange 101b and the end wall portion 110a of resonator housing 110, while a second set of springs 117 are retained between the opposite side of wall 110a and flange 101c. Spring groups 115 and 117 provide the elastic medium for forming a resonant vibration system. Thus, when rotor 50a of oscillator 50 is rotated by means of motor 62 at a proper frequency, resonant elastic vibration will be set up in the vibration system including the springs, drive shaft 101 and housing 110. Thus, as the oscillator connected housing 110 is vibratorily driven, the springs will be alternately compressed and expanded and will cause drive member 101 to be vibratorily driven along its longitudinal axis at the resonant vibration frequency. Centering springs 120 and 121 are provided between casing 105 and flange 101c and the casing and head portion 101a respectively. These springs are used to keep the vibration system in a desired average position for optimum coupling of the vibratory energy between drive member 101 and anvil 78.

With oscillator 50 driving the resonant vibration system at a resonant vibration frequency, unidirectional pulses of vibrational energy are provided from drive member 101 to cutter blade 42 via rectifier anvil 78 in the same manner as described for the first embodiment, with the end of drive member 101 driving against anvil 78 during the vibratory excursion towards the anvil and separating from the anvil during at least a portion of the vibratory excursion in the opposite direction, rectifier action thus being provided between the drive member and the anvil. Further, anvil 78 acts as a wedge, to tip the tree and predetermine its direction of fall, at the end of the cut.

The device may be supported from a vehicle or other support mechanism such as a hoist by means of lines 130 which are attached to support frame 105 and which have a lift cable 132 attached thereto. Hydraulic cylinders 135 and 136 which are connected between housing 105 and the cutter blade may be utilized to provide a bias, and a driving force in getting the blade started into the timber, at the start of the cutting action.

Referring now to FIGS. 8 and 9, a further embodiment of the device of the invention is illustrated; this embodiment being a hand operated version. Frame 140 has a handle 141 attached thereto for manipulating the device. Orbiting mass oscillator 50 has an eccentric rotor 50a which is rotatably driven by means of engine 62. Engine 62 is mounted on frame 140 and has its output drive shaft 62a coupled to the drive shaft of rotor 50a by means of coupler 142. When rotor 50a is rotatably driven by means of motor 62, the casing of oscillator 50 is vibrated at the rotation frequency of the rotor and transfers vibratory energy to cylindrical plate member 145 which is attached thereto. Diaphragm wall members 148 are fixedly attached to frame 140. Plate members 150 and 151 are joined together by means of bolts 152. Springs 154 provide resilient force between plate 145 and diaphragms 148 while springs 153 provide a resilient force between plate 145 and diaphragms 149. Springs 155 provide a resilient force between diaphragms 149 and cylindrical end plate 150, while springs 157 provide a resilient force between diaphragms 148 and cylindrical plate 151.

With rotation of rotor 50a, vibrational energy is transferred from the casing of oscillator 50 to plate member 145, this vibrational energy being transferred from plate 145 to springs 154 and 153. Springs 154 in turn transfer this vibrational energy through diaphragm 148 to springs 157, while springs 153 transfer the energy imparted thereto through diaphragm 149 to springs 155. Springs 157 and 155 in turn transfer the vibrational energy to plate members 151 and 150 respectively, these plate members moving in unison by virtue of the fact that they are tied together by means of bolts 152. It is to be noted that the assembly comprising plate members 150 and 151 and interconnecting bolts 152 vibrate in phase opposition to plate member 145 and the casing of oscillator 50.

The rotor 50a of oscillator 50 is rotated at a speed such as to set up resonant vibration of the resonant vibration system essentially formed by the mass of plate member 145 and the oscillator housing, which moves in opposition to the mass formed by plates 150 and 151 and bolts 152, the spring system formed by springs 154, 153, 155 and 157 between the two sets of opposing masses. It is to be noted that the paired spring system provides nodal regions of minimum vibration in the vibration pattern at the points where plate members 148 and 149 are attached to frame 140, this to minimize the transfer of vibrational energy to handle 141 and motor 62. The device of course should be designed and the frequency of vibration chosen so as to assure operation in this manner.

Cutter blade 42 has an anvil member 78 fixedly attached thereto. Bias springs 160 are retained between cup members 170, which are attached to end plate 151 by means of bolts 172, and anvil member 78. Springs 160 thus resiliently urge the anvil member towards plate 151. While a small rectifier gap 175 has been shown between anvil 78 and plate 151, such a gap would only appear during a portion of the rearward vibratory excursion of plate member 151. In the quiescent condition the opposing surfaces of anvil 78 and plate member 151 would normally be in abutment by bias springs 160.

In operation, with the oscillator producing resonant vibration of the vibration system including the aforementioned masses and spring system, plate member 151 which serves as a driver will impart unidirectional pulses of vibrational energy to anvil 78 and the attached cutter blade. As for the previous embodiments, a rectifier action is achieved whereby only vibratory excursions towards the cutter blade will be imparted thereto, the driver separating from the cutter blade during at least a portion of the reverse vibratory excursion.

While the invention has been described and illustrated in detail, it is to be clearly understood that this is intended by way of illustration and example only and is not to be taken by way of limitation, the spirit and scope of this invention being limited only by the terms of the following claims.

I claim:

1. Apparatus for cutting standing timber comprising:
   a cutter blade,
   means for resiliently biasing said cutter blade against the timber to be cut,
   an orbiting mass oscillator, a resonator member coupled to said orbiting mass oscillator to receive the vibrational output thereof, means for driving said orbiting mass oscillator at a frequency such as to cause resonant elastic vibration of said resonator member, and sonic rectifier means for coupling unidirectional pulses of vibrational energy from said resonator member to said cutter blade, said rectifier means including said resilient biasing means whereby the blade member is disengaged from the resonator member during a portion of each vibratory cycle.

2. The device of claim 1 and further including an anvil member attached to said blade member, said resonator member being resiliently urged by said biasing means against said anvil member, a gap being formed between said resonator member and said anvil member during the aforementioned portion of the vibration cycle.

3. The device of claim 1 and further including articulated support means for said blade member, and means for driving said articulated support means to position said blade member along two mutually orthogonal axes.

4. The device of claim 1 wherein said resilient biasing means comprises a spring and means for adjusting the resilient bias force applied by said spring.

5. The apparatus of claim 1 wherein said resonator member comprises a resonant elastic bar.

6. The apparatus of claim 1 wherein said resonator member comprises a drive member and spring means interposed between said drive member and said oscillator.

7. The apparatus of claim 6 wherein said drive member comprises a drive rod and first and second flange members fixedly attached to said rod in spaced relationship, said orbiting mass oscillator including a frame portion interposed between said flange members, said spring means including first spring means interposed between one of said flange members and said oscillator frame portion and second spring means interposed between the other of said flange members and said oscillator frame portion.

8. The apparatus of claim 1 wherein said oscillator includes a housing, said resonator member comprising the mass of said oscillator housing and a plate member attached to said housing, and a drive member for driving said blade in vibratory opposing phase relationship to the oscillatory housing and plate member and a spring system interposed between said opposing masses.

9. The apparatus of claim 8 wherein said apparatus comprises a hand operable tool, said tool including a frame, said oscillator housing being attached to the frame at points in the resonant vibration pattern of minimum amplitude.

10. The apparatus of claim 3 and further including vehicle means for supporting and positioning the blade to said apparatus against a tree trunk to be cut at the ground level portion thereof.

11. The apparatus of claim 10 and further including means for forcing said blade against said tree trunk during the start of the cutting thereof.

12. The apparatus of claim 5 and further including means for pivotally supporting said bar, said oscillator being attached to said bar.

13. The apparatus of claim 7 and further including detachable holder member means extending across the timber opposite said blade for holding the blade in position against said timber.

14. Apparatus for cutting standing timber comprising:

a cutter blade, frame means for pivotally supporting said blade, a resonator bar, means for pivotally supporting said bar on said frame means, orbiting mass oscillator means supported on said bar, means for driving said oscillator at a frequency such as to resonantly vibrate said bar member, an anvil member attached to said blade, spring means for resiliently urging said bar member against said anvil member, and means for positioning said blade against the timber at the portion thereof along the ground surface, the bar providing unidirectional pulses of vibrational energy to said blade during at least a portion of the vibratory excursion thereof towards said anvil member and separating from said anvil member during the vibratory excursion away from said anvil member.

15. The apparatus of claim 14 and further including boom means for pivotally positioning said frame and a vehicle for supporting said boom means.

16. The apparatus of claim 14 and further including a support member having a pair of arms pivotally supported on said frame means, said bar being supported between said arms, said spring means being positioned between said support member and said bar, and means for adjusting the urging force of said spring means against said bar.

17. The apparatus of claim 16 and further including a resilient bracket attached to said blade, said bracket being attached to said support member.

18. The apparatus of claim 14 and further including alignment rod means resiliently mounted on said frame means for engaging the timber and facilitating the alignment of the cutter blade therewith.

19. A method for cutting standing timber comprising the steps of:

resiliently biasing a cutting blade against the trunk of the timber, coupling an orbiting mass oscillator to a resonator, driving the orbiting mass oscillator at frequency such as to set up resonant elastic vibration of the resonator, and coupling unidirectional pulses of said vibrational energy from said resonator to said cutting blade, such that the blade strikes against the timber in a vibratory manner and the resonator disengages the blade during each vibratory cycle.

20. The method of claim 19 and further including the step of positioning the blade at a position along said timber at the surface of the ground.

21. The method of claim 19 and including the additional step of forcing the blade against the trunk during the initial portion of the cutting operation.

* * * * *

PO-1050
(5/69)

UNITED STATES PATENT OFFICE
CERTIFICATE OF CORRECTION

Patent No. 3688824  Dated September 5 1972

Inventor(s) ALBERT G. BODINE

It is certified that error appears in the above-identified patent and that said Letters Patent are hereby corrected as shown below:

(1) On the first page, the title should read:

SONIC TIMBER CUTTING METHOD AND APPARATUS (2) Column 1, Lines 1 and 2, the title should be:

SONIC TIMBER CUTTING METHOD AND APPARATUS

Signed and sealed this 30th day of January 1973.

(SEAL)
Attest:

EDWARD M. FLETCHER, JR.
Attesting Officer

ROBERT GOTTSCHALK
Commissioner of Patents